US012403499B2

(12) United States Patent
Enderle et al.

(10) Patent No.: US 12,403,499 B2
(45) Date of Patent: Sep. 2, 2025

(54) APPARATUS FOR CONVEYING VISCOUS MATERIAL

(71) Applicant: Atlas Copco IAS GmbH, Bretten (DE)

(72) Inventors: Gerrit Enderle, Knittlingen (DE); Thomas Hausner, Bretten (DE); Marco Knopf, Malschenberg (DE)

(73) Assignee: Atlas Copco IAS GmbH, Bretten (DE)

( * ) Notice: Subject to any disclaimer, the term of this patent is extended or adjusted under 35 U.S.C. 154(b) by 217 days.

(21) Appl. No.: 18/013,080

(22) PCT Filed: Jul. 19, 2021

(86) PCT No.: PCT/EP2021/070111

§ 371 (c)(1),
(2) Date: Dec. 27, 2022

(87) PCT Pub. No.: WO2022/028869

PCT Pub. Date: Feb. 10, 2022

(65) Prior Publication Data

US 2023/0249215 A1 Aug. 10, 2023

(30) Foreign Application Priority Data

Aug. 6, 2020 (DE) ..................... 10 2020 120 748.4
Aug. 6, 2020 (DE) ..................... 10 2020 120 815.4
Oct. 19, 2020 (DE) ..................... 10 2020 127 440.8

(51) Int. Cl.
*B05C 5/02* (2006.01)

(52) U.S. Cl.
CPC .................................. *B05C 5/0225* (2013.01)

(58) Field of Classification Search
CPC ...... B05C 5/0225; F04B 15/02; F04B 23/028; B67D 7/645
See application file for complete search history.

(56) References Cited

U.S. PATENT DOCUMENTS 5,957,338 A 9/1999 Lehmann
9,695,034 B2 7/2017 Sauer
(Continued)

FOREIGN PATENT DOCUMENTS

AT 512 536 A4 9/2013
CN 107921466 A 4/2018
(Continued)

OTHER PUBLICATIONS

English translation of DE 10 2007 003972, Specification, Sep. 30, 2024 (Year: 2024).*

(Continued)

*Primary Examiner* — Jeremy Carroll
(74) *Attorney, Agent, or Firm* — Collard & Roe, P.C.

(57) ABSTRACT

An apparatus for conveying viscous material from a container having a base and an upwardly-extending shell includes: a follower plate movable towards and away from the base adjacent to the shell inner surface facing the interior and having an outlet and at least one deaeration and/or aeration opening; a deaerator for sucking air through the deaeration opening(s) and/or an aerator for introducing compressed air through the aeration opening(s); a lifting/lowering device for lifting/lowering the plate; a control for alternately controlling the lifting/lowering device in a movement mode and the deaerator or aerator in a deaeration or aeration mode, the lifting/lowering device having at least one vertical holding rod connected to a plate upper side, the plate being vertically movable in a limited manner relative to the rod; and a sensor for detecting and transmitting to the control upper and lower end plate positions relative to the rod.

19 Claims, 3 Drawing Sheets

(56) References Cited

U.S. PATENT DOCUMENTS

Figure 2:
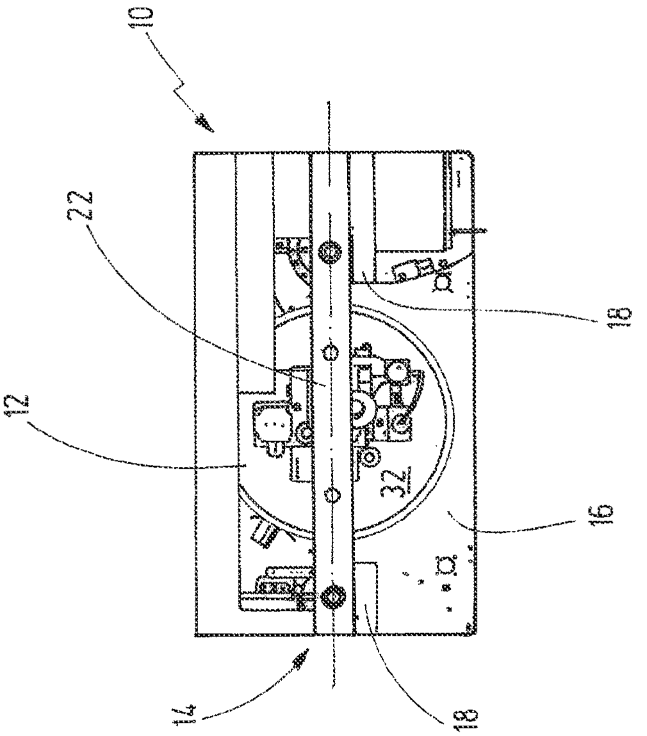

| | | | | |
|---|---|---|---|---|
| 11,480,164 | B2 | 10/2022 | Mori et al. | |
| 2008/0023082 | A1 | 1/2008 | Schucker | |
| 2008/0257915 | A1* | 10/2008 | Wold | A61M 11/007 222/389 |
| 2013/0256062 | A1 | 10/2013 | Kotyk et al. | |
| 2015/0375185 | A1 | 12/2015 | Waizenauer et al. | |
| 2016/0016786 | A1 | 1/2016 | Sauer | |
| 2016/0067735 | A1* | 3/2016 | Bourbeau | B05B 7/26 222/173 |
| 2018/0193871 | A1* | 7/2018 | Scholl | B05C 5/0225 |
| 2019/0184615 | A1 | 6/2019 | Gerke et al. | |
| 2020/0063726 | A1 | 2/2020 | Enderle et al. | |
| 2021/0046493 | A1 | 2/2021 | Fippl et al. | |
| 2021/0238024 | A1* | 8/2021 | Tasaka | B67D 7/645 |
| 2022/0299017 | A1* | 9/2022 | Sinders | F04B 53/143 |
| 2024/0408639 | A1* | 12/2024 | Gao | B05C 11/1034 |

FOREIGN PATENT DOCUMENTS

| | | | | |
|---|---|---|---|---|
| CN | 110035836 | A | 7/2019 | |
| DE | 10 2004 030 654 | A1 | 1/2006 | |
| DE | 102007003972 | A1 * | 7/2008 | B67D 7/0227 |
| DE | 20 2011 108 222 | U1 | 2/2012 | |
| DE | 10 2013 020932 | A1 | 7/2014 | |
| DE | 11 2013 001 703 | T5 | 12/2014 | |
| DE | 10 2014 011 395 | A1 | 1/2016 | |
| DE | 10 2016 108 807 | A1 | 11/2016 | |
| DE | 10 2017 000 047 | A1 | 7/2018 | |
| DE | 10 2017 215706 | A1 | 3/2019 | |
| DE | 10 2018 104 763 | A1 | 9/2019 | |
| EP | 0 827 937 | A1 | 3/1998 | |
| EP | 2 906 333 | B1 | 1/2017 | |
| EP | 3 296 075 | A1 | 3/2018 | |
| EP | 3 590 609 | A1 | 1/2020 | |
| GB | 2 069 060 | A | 8/1981 | |
| NO | 2018/192642 | A1 | 10/2018 | |
| WO | 2018/054548 | A1 | 3/2018 | |
| WO | 2019/166200 | A1 | 9/2019 | |

OTHER PUBLICATIONS

English translation of DE 10 2004 030 645, Specification, Sep. 30, 2024 (Year: 2024).*

Machine Translation of DE-102007003972-A1 (Year: N/A).*

International Search Report in PCT/EP2021/070111, mailed Nov. 8, 2021.

English translation of the International Preliminary Report on Patentability and Written Opinion of the International Searching Authority in PCT/EP2021/070111, mailed Feb. 16, 2023.

European Office Action dated Nov. 10, 2023 in European Application No. 21 745 819.9, with English translation of relevant parts.

German Search Report in DE 10 2020 127 440.8, dated May 17, 2021, with English translation of relevant parts.

Chinese Office Action in Chinese Application No. 202180056991.3 dated Apr. 30, 2025 with English translation.

* cited by examiner

APPARATUS FOR CONVEYING VISCOUS MATERIAL

CROSS REFERENCE TO RELATED APPLICATIONS

This application is the National Stage of PCT/EP2021/070111 filed on Jul. 19, 2021, which claims priority under 35 U.S.C. § 119 of German Application Nos. 10 2020 120 748.4 filed on Aug. 6, 2020; 10 2020 120 815.4 filed on Aug. 6, 2020; and 10 2020 127 440.8 filed on Oct. 19, 2020, the disclosures of which are incorporated by reference. The international application under PCT article 21 (2) was not published in English.

The invention relates to an apparatus for conveying viscous material out of a barrel-like container.

Such apparatuses are used, for example, for applying adhesives, sealants, insulation materials or heat-conductive pastes onto workpieces, in particular onto car body parts in the production of motor vehicles. In this regard, the viscous material is conveyed out of the container by way of a material outlet opening, by means of a pump, wherein a follower plate that has the material outlet opening is constantly held in contact with a surface of the material in the container by means of a lifting and lowering device, and follows the decreasing material level in the container by being lowered by means of the lifting and lowering device. The follower plate is sealed off relative to the container mantle, so that on the one hand, no material can penetrate out of the container, and on the other hand, air from the surroundings cannot penetrate into the container. Once the container has been emptied, it is replaced with a new, full container, wherein first the follower plate is moved upward out of the emptied container, so that then it can be introduced into the full container that has been positioned below it, in the meantime, until it rests on the viscous material and the conveying process can begin. During introduction of the follower plate into the full container, however, it is unavoidable that air is enclosed between the follower plate and the viscous material, which air must be removed before the viscous material is pumped out of the container. Furthermore, the follower plate lies against the inner surface of the container mantle that faces the container interior, with a seal around its circumference, so that a force must be exerted when it is lowered onto the surface of the viscous material. During manual introduction of a follower plate into a full container, pumping off the air situated in the container interior and lowering the follower plate onto the material surface requires great skill of the operator. It is furthermore known (cf. DE 10 2017 000 047 A1) to pump off material before starting to convey the viscous material and to reject it as waste until the conveyed material no longer has any air inclusions. However, this practice is particularly disadvantageous if the viscous material is very expensive.

It is therefore the task of the invention to develop an apparatus of the type stated initially, which allows automated introduction of the follower plate into the container and/or automated removal of the follower plate from the container.

This task is accomplished by means of an apparatus having the characteristics of claim 1. Advantageous further developments of the invention are the object of the dependent claims.

The invention is based on the idea of alternately switching between a movement mode, in which the holding rod or the holding rods is/are lowered, in particular driven by a motor, and a de-aeration mode, in that air is drawn off from the container interior by means of the deaeration device, through the de-aeration opening(s). For this purpose, the follower plate is mounted to float with reference to the lifting and lowering device, and can be moved vertically, within limits, relative to this device. In this regard, it is possible that the floating mounting is arranged between the follower plate and the at least one holding rod so that the follower plate can be moved vertically, within limits, relative to the at least one holding rod, or that it is arranged between the at least one holding rod and a vertically movable support element of the lifting and lowering device that carries the holding rod(s), so that it can be moved vertically, within limits, with reference to the support element, so that the follower plate is drawn further into the container interior by means of the production of a partial vacuum in the container interior, and the at least one holding rod or the support element remains in its position, so that subsequently, when pumping off the air has been completed, it is moved to the correct position. These steps are alternately repeated until the follower plate is resting on the viscous material. Vice versa, during removal of a follower plate from an emptied container, it is possible to alternately switch between the movement mode, in which the at least one holding rod or the support element is lifted, and an aeration mode, in which compressed air is introduced into the container interior. The excess pressure in the container interior presses the follower plate upward until it has reached the upper end position with reference to the at least one holding rod, whereupon the introduction of compressed air is stopped and the at least one holding rod or the support element is moved upward a certain distance, so as to advance the follower plate.

It is practical if the follower plate is connected with every holding rod, or the at least one holding rod is connected with the support element, by means of at least one bolt guided in an oblong hole that extends vertically. This is a simple but nevertheless reliable structure of the floating mounting of the follower plate on the at least one holding rod, so as to fasten it in place with limited vertical mobility with reference to the at least one holding rod. In this regard, it is preferred that the sensor device has a path measurement device for detecting the position of the follower plate with reference to the at least one holding rod or with reference to the support element. The path measurement device measures the path traveled by the follower plate with reference to the at least one holding rod or with reference to the support element, and thereby can determine the position of the follower plate with reference to the at least one holding rod or with reference to the support element, and also can determine when the upper and lower end positions have been reached, with great precision. However, it is also possible that the sensor device has at least one first sensor for detecting the bolt or one of the bolts when the upper end position is reached by the follower plate, and at least one second sensor for detecting the bolt or one of the bolts when the lower end position is reached by the follower plate. The sensors are preferably proximity switches. They turn on when the bolt or one of the bolts reaches either the lower or the upper end position.

It is possible that the at least one bolt is firmly connected with the follower plate and is guided in an oblong hole, in particular one that runs vertically, which hole also extends over the at least one holding rod or a component firmly connected with the latter. However, it is preferred that each holding rod, with its lower end, is held in a sleeve fixed in place on the top side of the follower plate, and that at least one bolt that is guided in an oblong hole of the sleeve projects radially away from the holding rod. The sleeve can be screwed onto the follower plate, for example. It is also possible and advantageous, in particular for smaller apparatuses, that every holding rod is held, with its upper end, in a sleeve that is fixed in place on a vertically movable component of the lifting and lowering device, in particular on the underside of a traverse. In this case, too, at least one bolt projects radially away from the at least one holding rod, which bolt is guided in an oblong hole of the sleeve. Furthermore, it is preferred that at least two bolts project radially away from each holding rod, at equal angular distances from one another, which bolts are each guided in an oblong hole of the related sleeve. In particular, two bolts can project radially away from each holding rod in opposite directions. This measure produces a symmetry that reduces stress on the bolts caused by torques that occur. Furthermore, it is preferred that the lifting and lowering device has multiple holding rods, which are preferably arranged concentrically and at equal distances from one another, around a center point of the follower plate. In other words, the holding rods run at equal distances from a center longitudinal axis of the follower plate, which is essentially structured to be cylindrical. In particular, two holding rods can be provided, which lie diametrically opposite one another with reference to the center point or the center axis.

In order to recognize when the container has been emptied, the follower plate can have a sensor for detecting when the plate sits on the container bottom. This sensor has a pin that projects out of the underside of the follower plate and can move into the follower plate counter to a reset force. The pin triggers the sensor signal when the follower plate sits on the container bottom with its full weight and the pin is pressed into the follower plate.

At least one aeration opening and at least one de-aeration opening arranged at a distance from the former can be provided. However, it is preferred that the aeration opening (s) and the deaeration opening(s) coincide, so that at least one opening is present in the follower plate for the introduction and withdrawal of air. The deaeration device can be a compressor or a Venturi tube, for example. It is also possible to configure the deaeration device in such a manner that it can be operated in the opposite direction and introduces compressed air into the container interior. However, it is also possible to supply the compressed air by way of a separate compressed air line.

In order to prevent viscous material from being drawn in from the container interior when air is drawn away, a cover layer composed of a material that is permeable for air and impermeable for liquid is arranged on the underside of the follower plate, according to a preferred exemplary embodiment, which layer covers the deaeration opening(s) and/or the aeration opening(s) and leaves the material outlet opening free. The cover layer can be adapted to the viscous material. It does not have to be impermeable for every liquid, but rather only for the viscous material in question, which is supposed to be conveyed out of the container. In particular, the cover layer can consist of a foldable material, for example of a thin felt layer or a commercially available weed control fabric. In order to facilitate laying the cover layer onto the material surface below the follower plate, the cover layer can be connected with a rigid ring on its circumferential edge. However, it is also possible that the cover layer is connected with a ring composed of elastically stretchable material on its circumferential edge. The latter configuration can also be implemented independent of the floating mounting of the follower plate on the at least one holding rod with limited vertical mobility of the follower plate with reference to the at least one holding rod or with reference to the support element. The cover layer preferably consists of polypropylene (PP), in particular of thermally bonded endless filaments. In this regard, a polypropylene layer that has a weight according to DIN EN 29073 T.1 of 60 $g/m^2$+/−10% is preferred, which has a maximum tensile strength according to DIN EN 29073 T.2 lengthwise of 130 N/5 cm and crosswise of 90 N/5 cm, +/−20%, in each instance, and an elongation of DIN 29073 T.3 lengthwise of 88% and crosswise of 87%, +/−20%, in each instance. Such a material is sold, for example, by the company p. glatzeder gmbh under the name PP spun-bonded 60 $g/m^2$—LA. Other weights per surface area are also possible. During introduction of the follower plate, air is drawn off from the container interior through the cover layer, while the viscous material is retained in the container, so that the scrap rate of material is reduced. Before introducing the follower plate into the container, the elastically stretchable ring can be stretched and pulled over the circumferential edge of the container mantle, so that it is arranged circumferentially around the container mantle on an outer side facing away from the container interior. When the follower plate is introduced into the container, it impacts the cover layer, so that the ring is pulled off the container mantle and lays itself around an outer mantle surface of the follower plate. The ring can then form an additional seal between the follower plate and the container mantle. When the container has been emptied and the follower plate has been removed from it, the cover layer, together with the ring, can be pulled off the follower plate and thrown away. A new cover layer is then fastened onto the container, in that its ring is pulled over the circumferential edge of the container mantle.

Figure 1:
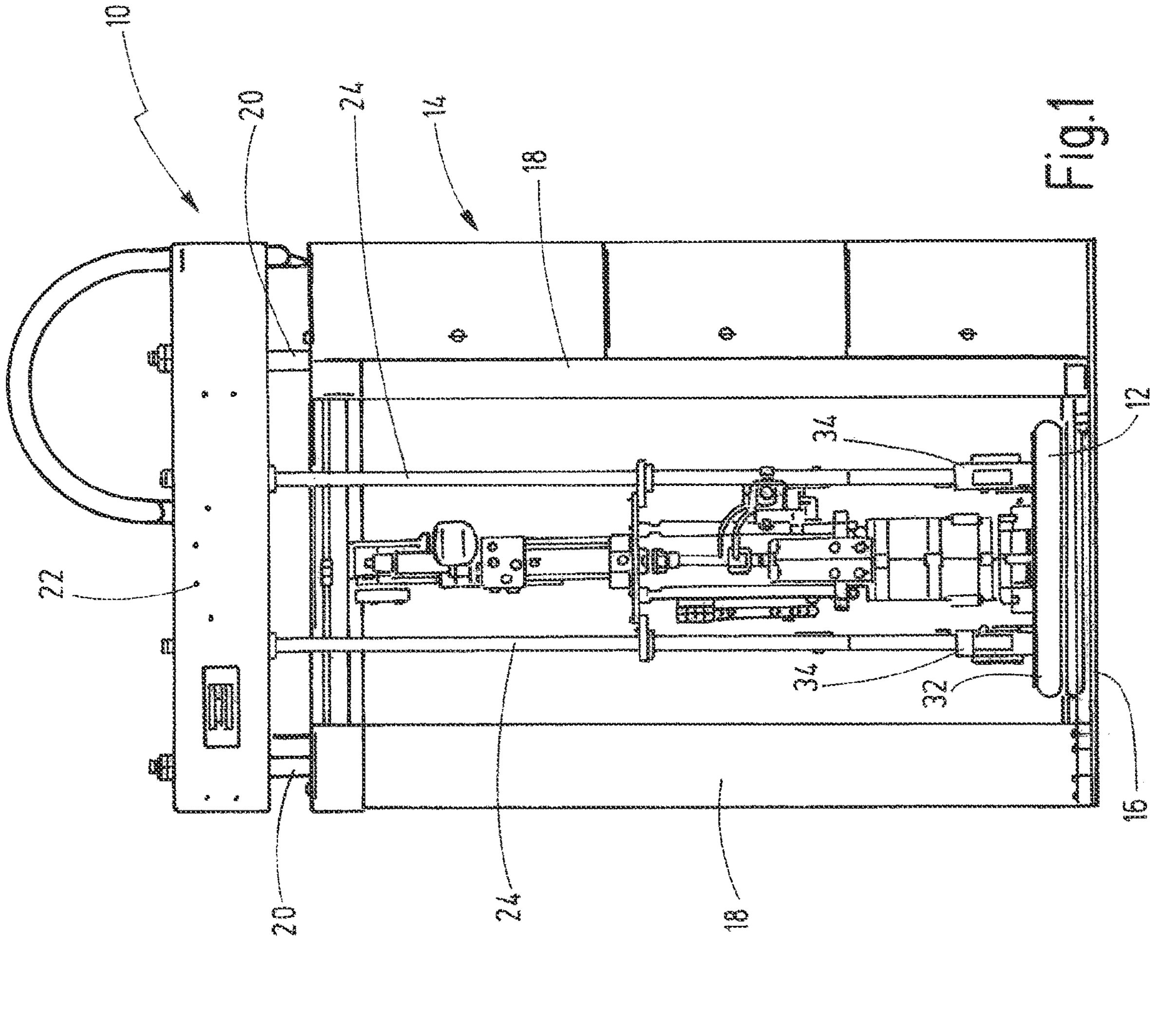
Figure 3:
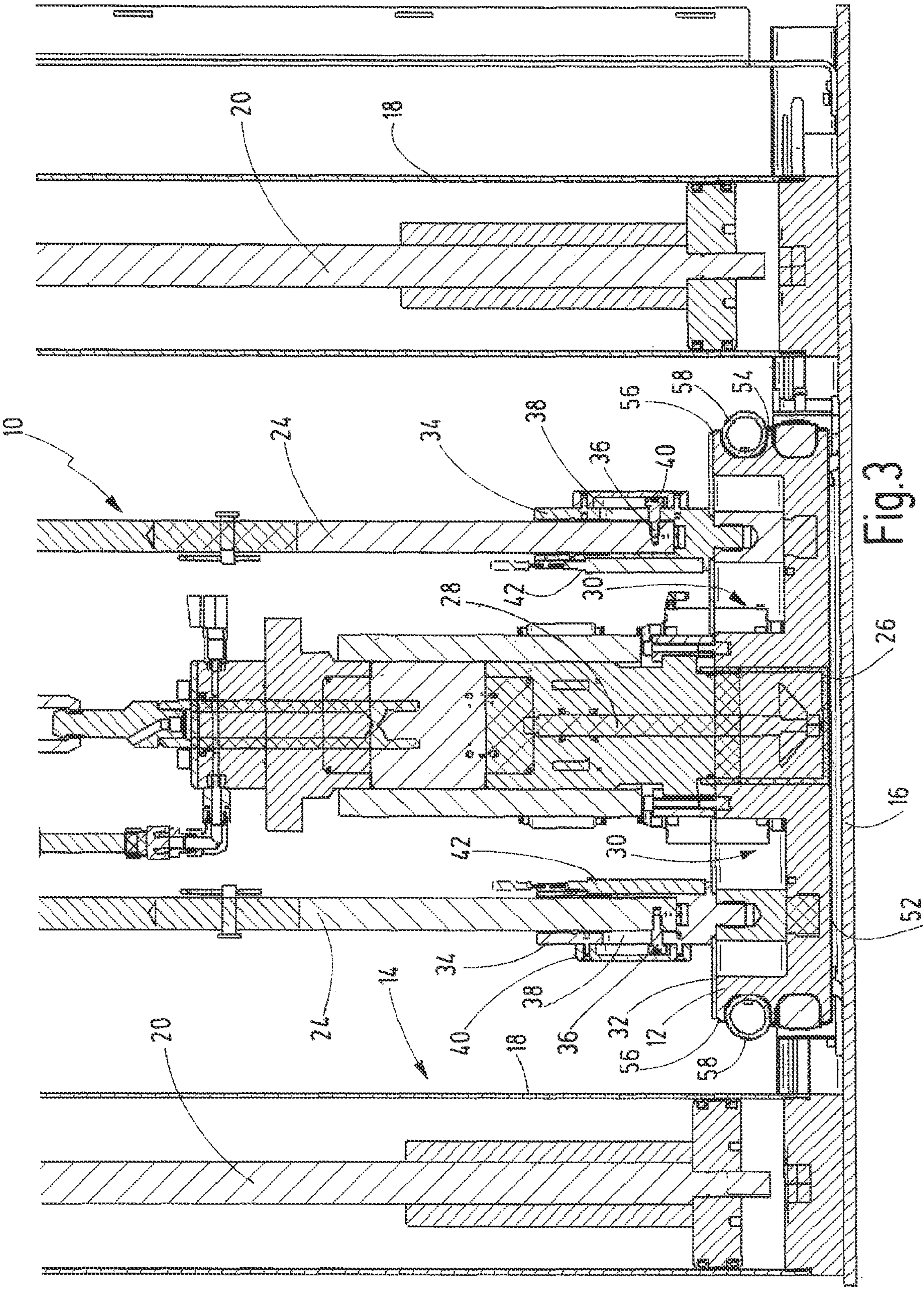
Figure 4:
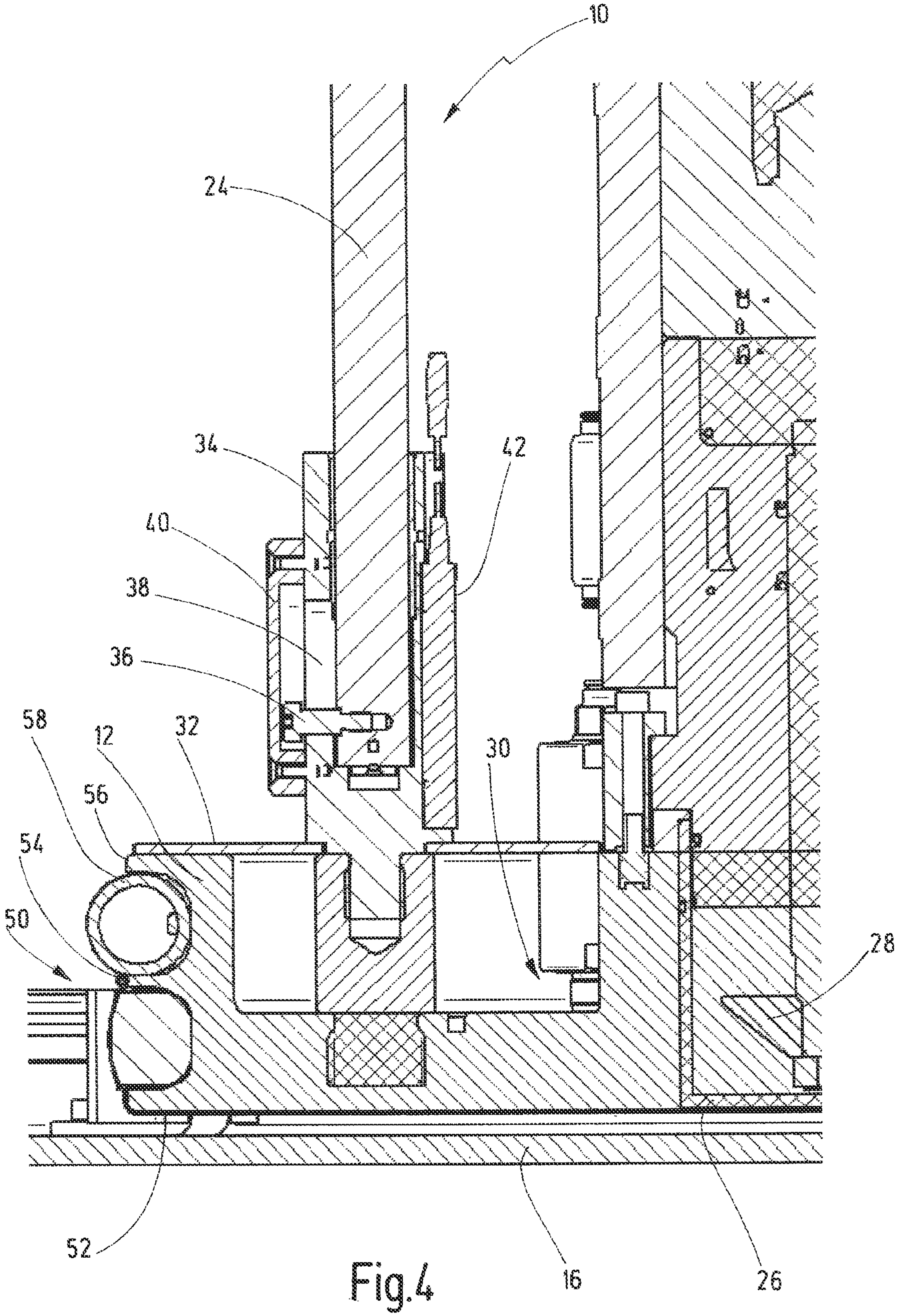

In the following, the invention will be explained in greater detail using an exemplary embodiment shown schematically in the drawing. The figures show:

FIG. 1 an apparatus for conveying viscous material, in a side view;

FIG. 2 the apparatus according to FIG. 1 in a top view;

FIG. 3 the lower region of the apparatus according to FIGS. 1, 2, in a section along the line A-A, and FIG. 4 an enlarged detail from FIG. 3.

The apparatus 10 shown in the drawing serves for conveying viscous material out of a barrel-like container. It has a follower plate 12 that can be lifted and lowered by means of a lifting and lowering device 14. The lifting and lowering device 14 has a bottom plate 16 as well as hydraulic cylinders 18 mounted on the bottom plate 16, the piston rods 20 of which are passed out toward the top and are connected with one another by means of a support element 22 in the form of a traverse. Two holding rods 24 extend downward from the traverse 22, on which rods the follower plate 12 is suspended.

The follower plate 12 has a material outlet opening 26 in its center, through which opening the viscous material can be conveyed out of the container by means of a chop-check pump 28 when the follower plate 12 lies on the viscous material with its underside. It furthermore has multiple aeration and de-aeration openings 30, through which air can be pumped out of the container interior and compressed air can be introduced into the container interior. Optionally, a deaeration device or an aeration device, not shown in any detail, can be connected with the aeration and deaeration openings 30.

The follower plate 12 is connected with the holding rods 24, not in a rigid manner, but rather mounted to float on them in the sense that it can move vertically, within limits, with reference to the holding rods 24. For this purpose, two sleeves 34 are screwed onto the top side 32 of the follower plate 12, which sleeves each hold the lower end of one of the two holding rods 24. A bolt 36 projects radially away from each of the holding rods, which bolt passes through an oblong hole 38 in the related sleeve 34 that extends in the vertical direction, and is guided in this hole so as to be displaceable in the vertical direction. Toward the outside, the oblong hole 38 is covered by a cover cap 40, in each instance. With regard to the holding rods 24, the follower plate 12 can be displaced between an upper end position, shown in FIGS. 3, 4, in which the bolts 36 lie against the lower end of the corresponding oblong hole 38, in each instance, and an upper end position, in which they lie against the upper end of the related oblong hole 38, in each instance. A sensor device in the form of a path measurement device 42 on each sleeve 24 detects the position of the follower plate 12 with reference to the holding rods 24 and, in particular, when the upper end position has been reached and when the lower end position has been reached by the follower plate 12. The path measurement device 42 emits signals to a control device, not shown in any detail, when the corresponding end position is reached by the follower plate 12.

In order to be able to convey viscous material out of a container, the follower plate 12 is lifted off the bottom plate 16 by means of the lifting and lowering device 14, and the container, which is open toward the top, is set up under the follower plate 12 on the bottom plate 16. A cover element 50 is then arranged on the container, which is open toward the top, so as to cover it. The cover element 50 has a cover layer 52 that is permeable for air but not for the viscous material. The cover layer 52 is thin and consists of a foldable material such as a commercially available weed control fabric, for example, or a thin felt layer. An elastically stretchable ring 54 runs in a circle around the cover layer 52, which ring is pulled over the mantle surface of the container, so that it lies against the mantle surface, on the outside, in the stretched state. The follower plate 12 is then lowered, presses down on the cover layer 52, and thereby pulls the elastic ring 54 off the mantle surface of the container, until it lies against the mantle surface 56 of the follower plate 12, as shown in FIG. 4. The cover layer 52 covers the aeration and deaeration opening 30, but not the material outlet opening 26. The follower plate 12 is lowered by means of the lifting and lowering device 14, to such an extent that a wiping ring 58 that runs around its mantle surface 56 makes contact with the inner surface of the container mantle, so that its friction force inhibits further introduction of the follower plate 12.

Further lowering of the holding rods 24 brings the follower plate 12 into its upper end position, so that the path measurement device 42 is triggered and the control device activates the deaeration device and stops the lifting and lowering device 14. By means of the partial vacuum that occurs in the container, the follower plate 12 is drawn downward until it reaches its lower end position, so that the path measurement device 42 is triggered, the control device deactivates the de-aeration device and turns on the lifting and lowering device 14, which lowers the holding rods 24. The switch between a movement mode, in which the de-aeration device is deactivated and the lifting and lowering device 14 moves the holding rods 24, and a de-aeration mode, in which the holding rods 24 are held in a fixed location and air is pumped out of the container interior through the aeration and de-aeration openings 30 by means of the de-aeration device, is continued until the follower plate 12 lies on the viscous material and the air has been pumped out of the container. Then the conveying process begins, during which the chop-check pump 28 pumps the viscous material out of the container. Due to the partial vacuum that occurs in the container, the follower plate 12 follows the material level until it reaches its bottom end position, whereupon once again the control device turns on the lifting and lowering device 14 on the basis of a signal of the path measurement device 42, so that the holding rods 24 are lowered until the follower plate 12 reaches its upper end position and the path measurement device 42 transmits a corresponding signal to the control device. In order to prevent the container from being lifted off the bottom plate 16 when a partial vacuum prevails in it, at least one hold-down firmly connected with the bottom plate 16 can be provided, which engages into a lower and/or into an upper container edge.

Once the container has been emptied, the follower plate 12 is removed from the container in accordance with the method of procedure during introduction of the follower plate 12 into the container. For this purpose, compressed air is introduced into the aeration and de-aeration opening 30 by means of the aeration device, and thereby the follower plate 12 is lifted up from the container bottom under the effect of pressure. It then gets into its upper end position, the path measurement device 42 is triggered, the control device interrupts the feed of compressed air and activates the lifting and lowering device 14, which lifts the holding rods 24 until the follower plate 12 has reached its lower end position once again. Then the path measurement device 42 is triggered once again, the lifting and lowering device 14 is stopped, and compressed air is introduced into the container interior again, and so forth, until the follower plate 12 reaches the upper container edge and can be lifted off.

In summary, the following should be stated: The invention, according to an exemplary embodiment, relates to an apparatus 10 for conveying viscous material out of a barrel-like container that has a container bottom and a container mantle that extends upward from the container bottom, having a follower plate 12 that can be moved toward the container bottom and away from the container bottom, lying against the inner surface of the container mantle, which faces the container interior, and that has a material outlet opening 26 and at least one de-aeration opening 30 and/or at least one aeration opening 30, having a de-aeration device for drawing off air from the container interior through the de-aeration opening(s) 30 and/or having an aeration device for introducing compressed air into the container interior through the aeration opening(s) 30, having a lifting and lowering device 14 for lifting and lowering the follower plate 12, having a control device for alternately controlling the lifting and lowering device 14 in a movement mode and the de-aeration device or the aeration device in a de-aeration mode or in an aeration mode, wherein the lifting and lowering device 14 has at least one holding rod 24 that runs vertically, which is connected with a top side 32 of the follower plate 12, wherein the follower plate 12 can be moved vertically, within limits, with reference to the at least one holding rod 24, and having a sensor device 42 for detecting at least one upper end position and at least one lower end position of the follower plate 12 with reference to the at least one holding rod 24 and for transmitting the detected positions to the control device.

The invention claimed is:

1. An apparatus for conveying viscous material out of a barrel-like container that has a container bottom and a container mantle that extends upward from the container bottom, the apparatus comprising:

a follower plate that can be moved in the direction toward the container bottom and away from the container bottom, lying against the inner surface of the container mantle, which faces the container interior, and that has a material outlet opening and at least one de-aeration opening and/or at least one aeration opening, a de-aeration device for drawing off air from the container interior through the de-aeration opening(s) and/or an aeration device for introducing compressed air into the container interior through the aeration opening(s), a lifting and lowering device for lifting and lowering the follower plate, a control device for alternately controlling the lifting and lowering device in a movement mode and the de-aeration device or the aeration device in a de-aeration mode or in an aeration mode, wherein the lifting and lowering device has at least one holding rod that runs vertically, which is connected with a top side of the follower plate and extends downward from a support element that can move in the vertical direction, wherein the follower plate can be moved vertically, within limits, with reference to the at least one holding rod and/or with reference to the support element, and a sensor device for detecting at least one upper end position and at least one lower end position of the follower plate with reference to the at least one holding rod or with reference to the support element and for transmitting the detected positions to the control device.

2. The apparatus according to claim 1, wherein the follower plate is connected with each holding rod or each holding rod is connected with the support element by means of at least one bolt that is guided in an oblong hole that extends vertically.

3. The apparatus according to claim 2, wherein the sensor device has at least one path measurement device for detecting the position of the follower plate with reference to the at least one holding rod or with reference to the support element.

4. The apparatus according to claim 2, wherein the sensor device has at least a first sensor for detecting the bolt or one of the bolts when the follower plate reaches the upper end position and at least a second sensor for detecting the bolt or one of the bolts when the follower plate reaches the lower end position.

5. The apparatus according to claim 4, wherein the sensors are proximity switches.

6. The apparatus according to claim 2, wherein each holding rod is held, with a respective lower end of each holding rod, in a sleeve fixed in place on the top side of the follower plate or, with a respective upper end of each holding rod, in a sleeve fixed in place on the support element, and wherein at least one bolt projects radially away from each holding rod, wherein the at least one bolt is guided in an oblong hole of the sleeve.

7. The apparatus according to claim 6, wherein at least two bolts project radially away from each holding rod, at equal angular distances from one another, which bolts are each guided in an oblong hole of the related sleeve.

8. The apparatus according to claim 1, wherein the lifting and lowering device has multiple holding rods.

9. The apparatus according to claim 1, wherein the follower plate has a sensor for recognizing that the plate sits on the container bottom, which sensor has a pin that projects out of the underside of the follower plate and can move into the follower plate counter to a reset force.

10. The apparatus according to claim 1, wherein the aeration opening(s) and the de-aeration opening(s) coincide.

11. The apparatus according to claim 1, wherein a cover layer composed of a material that is permeable for air and impermeable for liquids, which cover layer covers the de-aeration opening(s) and/or the aeration opening(s) and leaves the material outlet opening free is arranged on the underside of the follower plate.

12. The apparatus according to claim 11, wherein the cover layer comprises a foldable material.

13. The apparatus according to claim 12, wherein the cover layer is connected with a rigid ring on a circumferential edge of the cover layer.

14. The apparatus according to claim 12, wherein the cover layer is connected with a ring composed of elastically stretchable material on a circumferential edge of the cover layer.

15. An apparatus for conveying viscous material out of a barrel-like container that has a container bottom and a container mantle that extends upward from the container bottom, the apparatus comprising:

a follower plate that can be moved in the direction toward the container bottom and away from the container bottom, lying against the inner surface of the container mantle, which faces the container interior, and that has a material outlet opening and at least one deaeration opening and/or at least one aeration opening, a de-aeration device for drawing off air from the container interior through the de-aeration opening(s) and/or an aeration device for introducing compressed air into the container interior through the aeration opening(s), a lifting and lowering device for lifting and lowering the follower plate, and a control device for alternately controlling the lifting and lowering device in a movement mode and the de-aeration device or the aeration device in a de-aeration mode or in an aeration mode, wherein a cover layer composed of a material that is permeable for air and impermeable for liquids and covers the de-aeration opening(s) and/or the aeration opening(s) and leaves the material outlet opening free is arranged on the underside of the follower plate, which cover layer is connected with an elastically stretchable ring on a circumferential edge of the cover layer, wherein the elastically stretchable ring is configured to be stretched and pulled over a circumferential edge of the container mantle and, when the follower plate is introduced into the container and impacts the cover layer, to be pulled off the container mantle and laid around an outer mantle surface of the follower plate.

16. The apparatus according to claim 11, wherein the cover layer comprises polypropylene (PP).

17. A method for introducing the follower plate of the apparatus according to claim 1 into a barrel-like container that is open toward the top, has a container bottom and a container mantle that extends upward from the container bottom, wherein the follower plate is lowered onto the container by means of the lifting and lowering device, until the follower plate lies against the inner surface of the container mantle, forming a seal, wherein the follower plate is lowered by means of alternately switching between the movement mode and the de-aeration mode after the upper end position of the follower plate has been reached, by means of de-aeration of the container interior, and the at least one holding rod or the support element is lowered by means of the lifting and lowering device after the lower end position of the follower plate has been reached.

18. The method according to claim 17, wherein the cover layer of the apparatus used in the method is connected with a ring composed of elastically stretchable material on its circumferential edge, wherein before lowering the follower plate onto the container, the cover layer is affixed to the container, in that the ring is stretched and drawn over the circumferential edge of the container mantle, so that the ring is arranged circumferentially around the container mantle on an outer side that faces away from the container interior, and wherein the ring is drawn from the container mantle by means of impacting the cover layer by means of the follower plate during its introduction into the container, and lays itself around an outer mantle surface of the follower plate.

19. The method for removing the follower plate of the apparatus according to claim 1 from a barrel-like container that is open toward the top, has a container bottom and a container mantle that extends upward from the container bottom, wherein the at least one holding rod or the support element is lifted by means of alternately switching between the movement mode and the aeration mode after the upper end position has been reached by the follower plate, and the follower plate is lifted after the follower plate has reached its lower end position, by means of introducing compressed air into the container interior.

* * * * *